United States Patent Office 3,031,785
Patented May 1, 1962

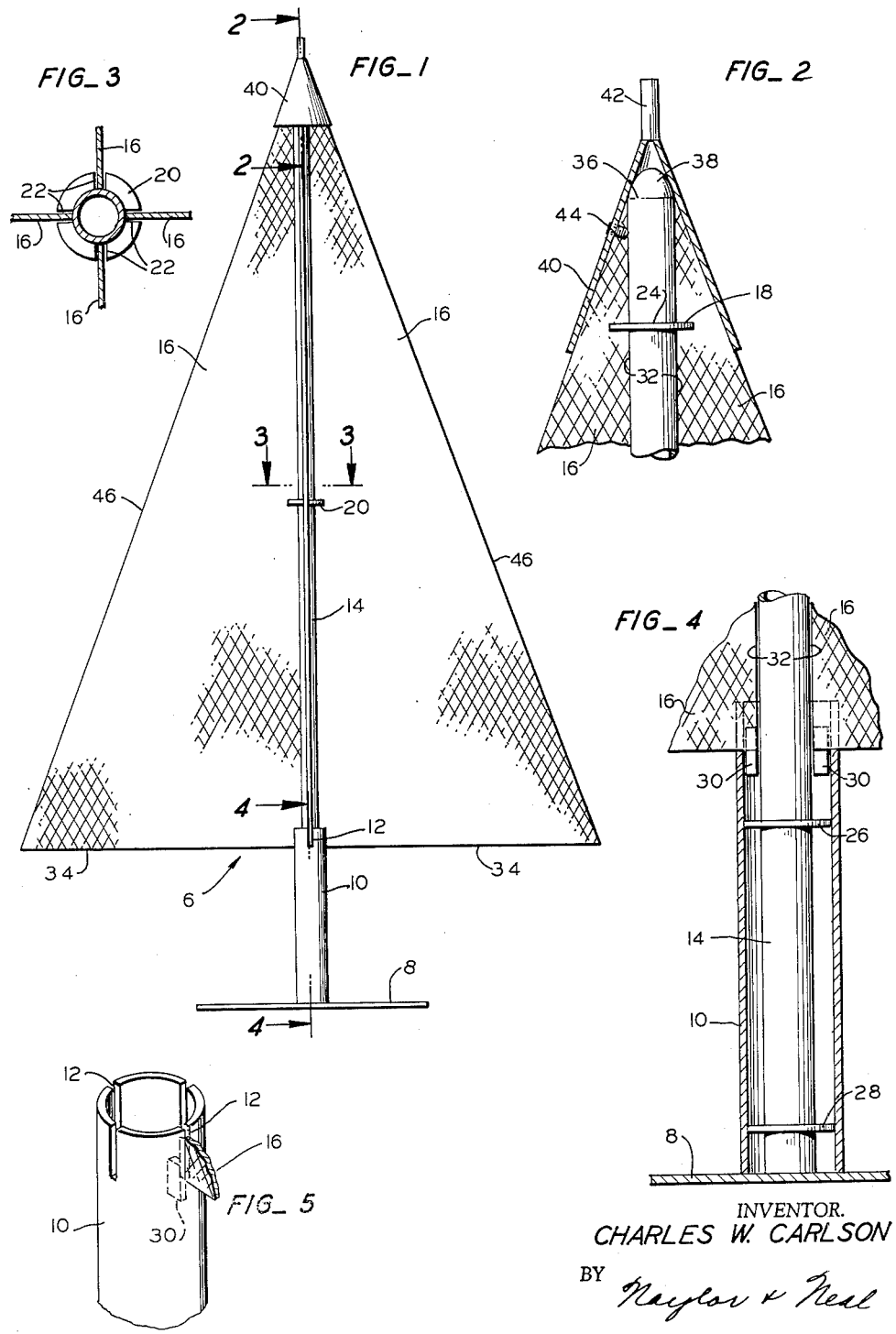
May 1, 1962 — C. W. CARLSON — 3,031,785
KNOCKDOWN ARTIFICIAL TREE
Filed July 17, 1959 — 2 Sheets-Sheet 1
INVENTOR.
CHARLES W. CARLSON
BY Naylor & Neal
ATTORNEYS May 1, 1962 C. W. CARLSON 3,031,785
KNOCKDOWN ARTIFICIAL TREE
Filed July 17, 1959 2 Sheets-Sheet 2
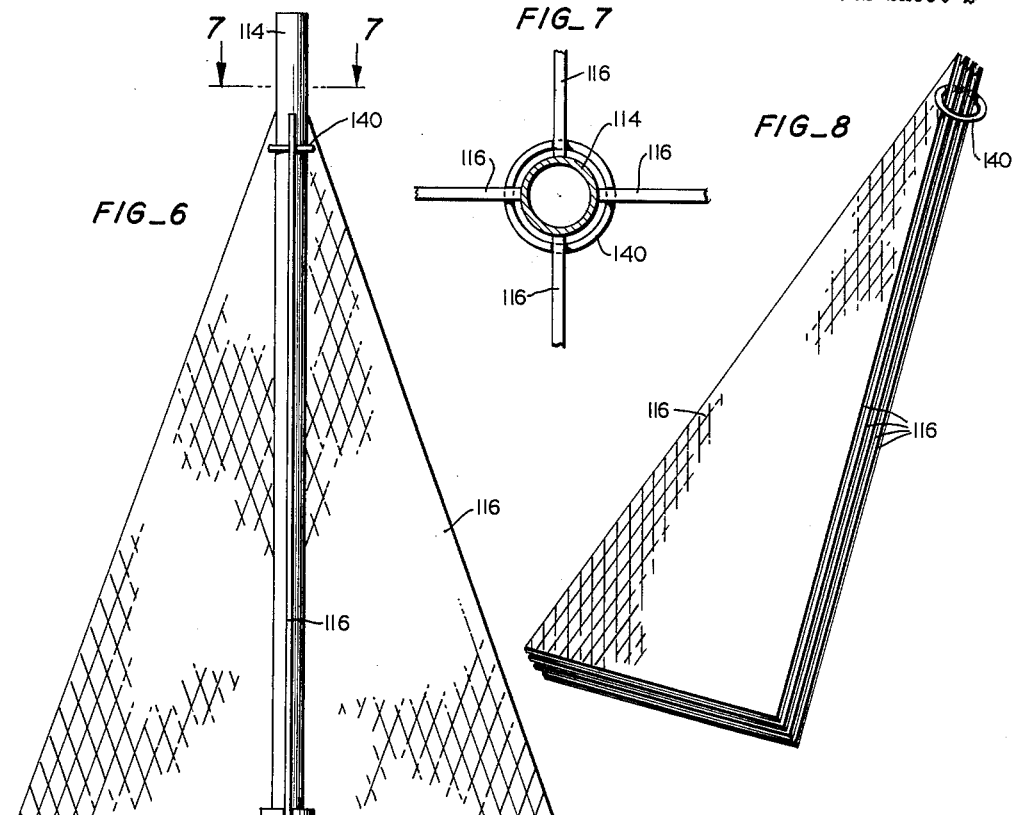
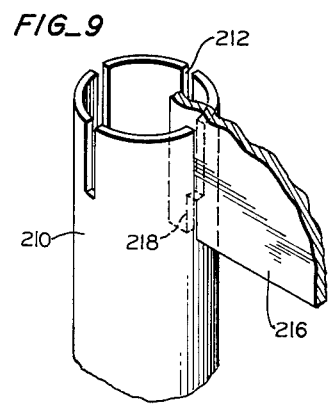
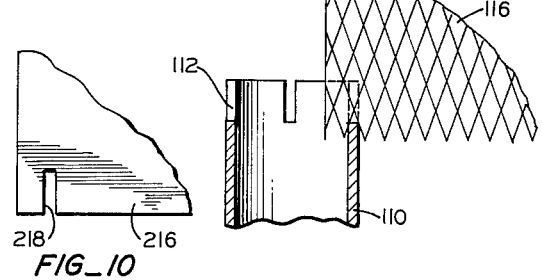
INVENTOR.
CHARLES W. CARLSON
BY
*Naylor & Neal*
ATTORNEYS

3,031,785
KNOCKDOWN ARTIFICIAL TREE
Charles W. Carlson, 5 Arlington Ave., Berkeley, Calif.
Filed July 17, 1959, Ser. No. 827,874
5 Claims. (Cl. 41—15)

This invention relates in general to ornamental objects, and more particularly, to an artificial tree constructed for quick and easy assembly and disassembly.

It is an object of this infention to provide an attractive tree of simple construction which may be easily fabricated from a number of readily available materials and which is subject to easy assembly and disassembly, as for transportation and storage.

It is a further object of this invention to provide a tree of the character described which is susceptible of a wide variety of uses, having particularly suitability for use as a Christmas tree in window displays, store and house decorations, and in outdoor gardens and the like.

Other objects and advantages of this invention will become apparent from the description which follows when taken in conjunction with the drawing, in which:

FIGURE 1 is a view in side elevation illustrating the tree of this invention fully assembled.

FIGURE 2 is a view in section taken on the line 2—2 of FIGURE 1, illustrating details of the interior construction of the upper portion of the tree.

FIGURE 3 is a view in section taken on the line 3—3 of FIGURE 1, showing the manner of installation of the branch-simulating panels within the slots of a typical locking ring.

FIGURE 4 is a view in section taken on the line 4—4 of FIGURE 1, illustrating interior construction details of the lower portion of the tree.

FIGURE 5 is a fragmentary view in perspective in which is shown the base support tube and the slots provided in its upper end for the receipt of the tree branch-simulating panels.

FIGURE 6 is a view in side elevation of a modification of the tree.

FIGURE 7 is a view taken along lines 7—7 of FIGURE 6.

FIGURE 8 is a view in perspective of a compacted arrangement of the branch-simulating panels of the tree of FIGURE 6.

FIGURE 9 is an enlarged detail view in perspective of the base support tube of the tree of FIGURE 6.

FIGURE 10 is a detail view in side elevation of one form of means for connecting a panel to the base support tube.

FIGURE 11 is a vertical sectional view through a base support tube illustrating the manner of connecting an expanded metal panel to the support tube.

Referring now to the drawings, the tree, generally designated 6, is shown fully assembled in FIGURE 1. The tree base or stand is comprised of a horizontally disposed flat circular base plate 8, centrally of which is secured an upright trunk support tube 10. As illustrated in FIGURE 4, the tube 10 is constructed of thin wall metal tubing welded about its base to plate 8. Although such metal construction is highly satisfactory, it should be understood that the base may, as well, be made of wood, plastic, or other similarly suitable material offering sufficient rigidity for tree support. The height of tube 10 and the diameter of plate 8 may, of course, be varied as necessary to provide support commensurate with the tree load above. It may be here noted that plate 8 is not limited to a circular configuration. It may assume a variety of shapes as desired, subject, of course, to the support requirements of the tree structure thereabove. Provided in the upper end of support tube 10 are four generally rectangular vertical slots 12 spaced apart to divide the tube upper end into quadrants and serving to receive the tree panels, as in FIGURE 4, to provide support and guidance therefor.

Concentrically disposed within support tube 10 is an upright trunk tube 14, flat at the base and rounded at the top and of substantially lesser outer diameter than the inner diameter of the tube 10. The trunk tube 14, when positioned as in FIGURE 4, with its base in abutment with the upper surface of plate 8, forms a rigid backbone for the tree, from which the four branch-simulating right triangular panels radiate, said panels being shown as being formed of expanded metal. A pair of split lock or panel positioning rings 18 and 20 are fixedly secured to the trunk tube 14 near its top and middle, respectively. Depending upon the particular materials used for construction of the trunk tube 14, rings 18 and 20 may be welded, glued, or otherwise suitably affixed to said trunk tube, or, if desired, they may be formed integral therewith. In FIGURE 3, lower ring 20 is shown provided with a plurality of radially extending panel receiving slots 22 of similar dimensions and displaced at 90° intervals, dividing the ring into quadrants. Lock ring 18 is similarly provided with radially extending quadrant-forming slots 24 which are vertically aligned with corresponding slots 22 of ring 20 therebelow. Slots 22 and 24 coact with complementary slots in trunk support tube 10 to receive and fix panels 16 in the vertical position of FIGURE 1, and accordingly, it is desirable that each of said slots be of a dimension permitting relatively tight fit of the panels therein.

Secured near the lower end of the trunk tube 14 are a pair of spaced apart spacer rings 26 and 28 which serve as a stabilizing footing for trunk tube 14 as they bear against the interior wall of trunk support tube 10, FIGURE 4. Like lock rings 18 and 20, spacer rings 26 and 28 may be secured to the trunk tube 14 in a variety of ways, or formed integral therewith, if desired. As described more fully hereinafter, provision of a substantial space between the trunk tube 14 and the support tube 10, thus necessitating use of the above described stabilizing spacer rings, permits insertion between said tubes of the locking lugs 30 carried by the panels 16. The trunk tube 14 may be made of a wide variety of materials; however, thin wall aluminum tubing is suggested as being particularly satisfactory, offering a rigid backbone support of relatively lightweight and permitting use of a supporting base assembly of lighter weight and/or reduced size.

The four vertically disposed branch-simulating panels 16 are of right triangular shape, each having secured at its lower inside corner or right angle vertex in depending relationship a locking lug or tab 30 which functions primarily to firmly secure the panel inner margin 32 in abutment with or closely adjacent to the trunk tube 14, as in FIGURE 4. As shown in FIGURE 5, each of such lugs is of generally rectangular shape and of approximately the same thickness as that of the panels 16. However, this dimensional relationship may be changed if desired. In this connection it should be noted that by increasing the thickness of the lugs and effecting an arcuate shaping of their inner and outer vertical surfaces such that said surfaces are respectively in abutment with the adjacent surfaces of trunk tube 14 and support tube 10, the tendency of panels 16 to pivot about a vertical axis with the tube 10 as a fulcrum is reduced. The vertical dimension of lugs 30 may similarly be subject to variations; however, it is essential, except as noted below, that they project downwardly from the panel lower margin 34 a distance sufficient to permit a firm fixing of the lower ends of the panels in abutment with, or closely adjacent, the trunk tube 14. A relatively tight fit between lugs 30 and the abutting surfaces of tubes 10 and 14 is therefore essential and the front to back dimensions of the lugs are governed accordingly. It should be noted that if the thickness of the lugs 30 is made greater than the width of the slots 12, the lugs need not project downward beyond the panel lower margins 34, panel retention in such case being effected by lug abutment with trunk tube 14 and with the side wall of the tube member 10 adjacent opposite sides of the slots.

The length of each of the panel inner margins 32 is governed by the distance between the base of its receiving slot 12 in support tube 10 and the line of intersection 36 of the trunk tube vertical side wall with the trunk tube rounded upper end portion 38, FIGURE 2. The length of the horizontal lower margin 34 of each of the panels 16 is largely dependent upon aesthetic considerations; however, fixing of such panel dimension will determine the configuration of the top conical member 40, as described more fully hereinafter. It is, however, desirable that the panels 16 be of similar dimensions for reasons both of appearance and function, as will become more apparent from the description which follows of member 40 as utilized for securing the upper ends of the panels 16 in place. These branch-simulating panels may be made up of a number of different materials according to the purpose or effect desired. The use of expanded aluminum or steel panels, however, is suggested as providing a pleasing appearance and facilitating the placement and retention of decorations upon said panels. Other satisfactory materials for panel construction include, but are not limited to, corrugated metal, welded wire, plywood, Masonite, and plastic. Although the tree is illustrated in the drawings and described above with reference to four panels, incorporation of a particular number of panels is not to be construed as a limitation, for the tree may, as well, incorporate various numbers of panels with the slots in the support tube 10 and the lock members 18 and 20 varied in number accordingly.

A generally conical top member 40, from which upwardly projects a cylindrical ornament holder 42, is releasably secured, as in FIGURE 2, atop trunk tube 14 by means of a set screw 44 threaded in member 40 for abutment with said trunk tube at a point below the tube top portion 38. The top member 40 serves as a means for retaining the upper ends of panels 16 in abutment with, or closely adjacent the trunk tube 14; and accordingly, it is desirable, although not absolutely necessary, that the walls of said top member and the inclined panel outer margins 46 be substantially parallel when member 40 is secured atop the panels 16, as in FIGURE 2. This permits substantially continuous abutment between the upper lapped portions of panel margins 46 and the inner surface of member 40, promoting panel retention, preventing panel gouging, and creating a pleasing appearance.

In addition to its attractive appearance and its adaptability for construction from a wide variety of materials, the tree is easily assembled from knocked-down condition in the following manner. The base is positioned upon a horizontal supporting surface such as a floor and the trunk tube 14 inserted therein to assume the vertical position of FIGURE 4, with spacer rings 26 and 28 in abutment with the interior wall of support tube 10. For convenience in aligning the lock ring slots 22 and 24 with the corresponding support tube slots 12 for receipt of the panel inner portions, index marks (not shown) may be scribed, or otherwise placed, upon the tubes 10 and 14 for guidance in positioning such tubes. The panels 16 are next positioned in aligned slots 12, 22 and 24, bringing their inner margins 32 into abutment with or closely adjacent trunk tube 14 and thereby into substantially parallel relationship with the tube axis. The locking lugs 30 are positioned intermediate tubes 10 and 14 thereby to fix the panels in their tube-abutting positions. When thus positioned, the panels 16 radiate from tube 14, adjacent panels being vertically disposed in right angle relationship, as in FIGURE 3, with opposite panels being in substantial alignment with each other. The tree assembly is completed by securing the panel upper ends in placement by positioning conical top member 40 atop tube 14 in substantially continuous abutment with the upper ends of the panel outer margins 46 and turning down set screw 44 to engage tube 14, thus securely fixing said top member in place.

A more preferred form of the tree is shown in FIGURES 6–8 and 11. Here, the expanded metal panels 116 extend through the slots 112 of base support tube 110 and are secured against lateral disengagement by means of the overlapping relation between the tube wall and one of the half-diamond indentations defining the jagged end edges of panels 116. A tie ring 140 extending through similarly positioned expansion openings of panels 116 serves to permanently secure the panels together and enables the superposed panel relationship of FIGURE 8 for convenient handling and storage. Ring 140 fits over trunk tube 114, thereby serving to hold the panels in the proper position relative to tube 114. Base 108 completes the tree. Tube 114 is supported within tube 110 by ring elements corresponding to 26 and 28 in FIGURE 4.

FIGURES 9 and 10 show a panel, and panel to support tube connection, wherein the panel is imperforate in the sense of not being formed of expanded metal. The tube 210 is provided with slots 212 and panel 216 is provided with a slot 218.

From the above it can be seen that I have provided an artificial tree of simple construction, readily fabricated from a wide variety of commonly available materials, susceptible of extremely easy assembly and disassembly, and of pleasing appearance.

What is claimed is:

1. An artificial tree comprising, in combination, a base having an upwardly extending hollow support member which is provided about its upper end with a plurality of spaced apart slots, an elongated trunk member, the lower end of which is received within the support member in spaced relationship therewith, spacer means positioned at the lower end of the trunk in abutment with the support member inner wall to stabilize the lower end of the trunk member, said trunk member extending continuously for a substantial distance above said support member, a plurality of branch-simulating panels received for support within said slots and disposed with their inner margins immediately adjacent the trunk member, said panels each being provided at their lower inside corners with a lug received between the trunk member and the support member for releasably securing the panel lower ends, and means disposed above said support member in embracing relation with said trunk member and with portions of each of said panels securing said panels in position against radial movement away from said trunk member.

2. An artificial tree comprising, in combination, a base having an upwardly extending support tube about the upper end of which are disposed a plurality of spaced apart slots, an elongated cylindrical trunk member positioned with its lower end within said support tube, said trunk member at its lower end being of substantially lesser outer diameter than the inner diameter of the support tube and having secured thereat spacer means for abutment with the adjacent support tube inner wall to thereby stabilize the trunk member, said trunk member extending continuously for a substantial distance above said support member, a plurality of branch-simulating panels supported with their lower inside corner portions within the support tube slots and with their inner margins in substantially parallel relationship with the longitudinal axis of the trunk member, said panels each being provided at their lower inside corners with a lug received between the trunk member and the support tube for fixing the position of the panel lower ends, and means disposed above said support member in embracing relation with said trunk member and with portions of each of said panels securing said panels in position against radial movement away from said trunk member.

3. An artificial tree comprising a base having an upwardly extending hollow and generally cylindrical support member having around the upper end thereof a plurality of spaced apart slots, a generally cylindrical and elongated trunk member having the lower end thereof extending within said support member, said trunk member extending continuously for a substantial distance above support member, spacer means carried by one of said support and trunk members in engagement with the other of said members to maintain the trunk member in spaced and stabilized arrangement with respect to said support member, a plurality of branch-simulating panels having their lower ends extending through said slots into immediately adjacent relation to said trunk member, means formed on said panels extending between said trunk and support members below the level of said slots adapted to prevent lateral movement of the lower ends of said panels outwardly from said trunk member, and connector means disposed adjacent the upper ends of said panels in embracing relation to at least portions of said upper ends and to said trunk member coactive with said slots to maintain said panels in immediately adjacent relation to said trunk member.

4. The tree of claim 3, said connector means comprising a ring member extending through apertures formed in said panels, said ring member being disposed in concentric relation to said trunk member.

5. The tree of claim 4, said ring and panels being freely removable from said trunk and support members as a sub-assembly by sliding movement upwardly of said sub-assembly relative to said trunk member until said ring is moved past the upper end of said trunk member.

References Cited in the file of this patent

UNITED STATES PATENTS

| | | |
|---|---|---|
| 1,577,207 | Dieperink | Mar. 16, 1926 |
| 1,600,813 | Flentye | Sept. 21, 1926 |
| 1,907,769 | Favreau | May 9, 1933 |
| 2,188,081 | Guthrie | Jan. 23, 1940 |
| 2,565,700 | Schiller | Aug. 28, 1951 |
| 2,916,843 | Meyer | Dec. 15, 1959 |